United States Patent [19]

Jan et al.

[11] Patent Number: 4,875,435
[45] Date of Patent: Oct. 24, 1989

[54] FLUIDIZED BED DRYER/GRANULATOR

[75] Inventors: Chaur-Ming Jan, Randolph, N.J.; Mark E. Oehling, Stroudsburg, Pa.

[73] Assignee: Warner-Lambert Company, Ann Arbor, Mich.

[21] Appl. No.: 159,805

[22] Filed: Feb. 24, 1988

[51] Int. Cl.⁴ ............................................. B05C 19/02
[52] U.S. Cl. ..................................... 118/62; 118/303; 118/DIG. 5; 34/241; 34/181; 34/182
[58] Field of Search .............. 118/19, 20, DIG. 5, 118/303, 62; 427/185, 213; 425/DIG. 20; 34/241, 181, 182

[56] References Cited

U.S. PATENT DOCUMENTS

| | | | |
|---|---|---|---|
| 380,588 | 4/1888 | Noth | 34/181 |
| 3,233,584 | 2/1966 | Augstadt | 118/DIG. 5 |
| 4,532,155 | 7/1985 | Golant et al. | 118/DIG. 5 |
| 4,724,794 | 2/1988 | Itoh | 118/19 X |

Primary Examiner—Shrive Beck
Attorney, Agent, or Firm—Ronald A. Daignault

[57] ABSTRACT

A fluidized bed dryer/granulator (10) for coating pellets (P) used in the preparation of pharmaceutical materials, comprises a chamber (11) having a top wall (12) and a bowl (16) at the bottom thereof and an axial air inlet (19) for directing a flow of air axially therethrough, and at least one removable air inlet (20, 21) positioned in the chamber for directing a circumferential flow of air into the chamber to interact with the axial flow to produce an orbital or swirling motion, enhancing the rate of treatment of the material in the chamber.

8 Claims, 1 Drawing Sheet

FLUIDIZED BED DRYER/GRANULATOR

FIELD OF THE INVENTION

This invention relates to fluidized bed apparatus for treating pulverulent material, and more particularly, to a fluidized bed dryer/granulator for applying a coating to pellets used in pharmaceutical preparations.

DESCRIPTION OF THE PRIOR ART

In the production and/or treatment of various pulverulent or granular materials, including pharmaceutical preparations, fluidized bed apparatus is commonly used to promote coating, drying and/or granulation of the material. In some conventional apparatus, air or other gaseous medium is caused to flow through a chamber to form granules from a fluid introduced into the chamber, or to coat and/or dry pulverulent material already in the chamber. Examples of some prior art devices are shown in the following patents: U.S. Pat. Nos. 3,443,621, 3,607,365, 3,716,020 and 3,828,729; British Pat. Nos. 1,212,074 and 1,517,104; and German Offenlegungsschrift No. 27 38 485.

Conventional fluidized bed apparatus for drying and/or coating granular material is either relatively complex and expensive in construction, expensive to operate, and/or has a very specialized use limited by fixed components of the apparatus.

SUMMARY OF THE INVENTION

According to the invention, a fluidized bed chamber for containing material to be treated has an axial air inlet for directing a flow of air axially therethrough, and at least one removable air inlet is positioned in the chamber for directing a circumferential flow of air into the chamber to interact with the axial flow to produce an orbital or swirling motion, enhancing the rate of treatment of the material in the chamber. The apparatus is thus exceptionally simple and economical in construction and at the same time achieves an economy of operation not obtained in most prior art devices.

BRIEF DESCRIPTION OF THE DRAWINGS

The foregoing and additional objects and advantages of the invention will become apparent from the following detailed description and appended claims taken in conjunction with the drawings, wherein like reference characters designate like parts throughout the several views and wherein:

DESCRIPTION OF THE PREFERRED EMBODIMENTS

Figure 1:
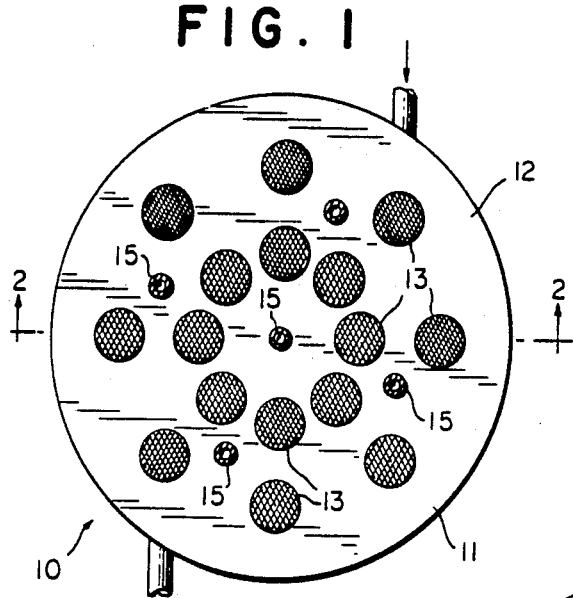
FIG. 1 is a top plan view of the apparatus of the invention.
Figure 4:
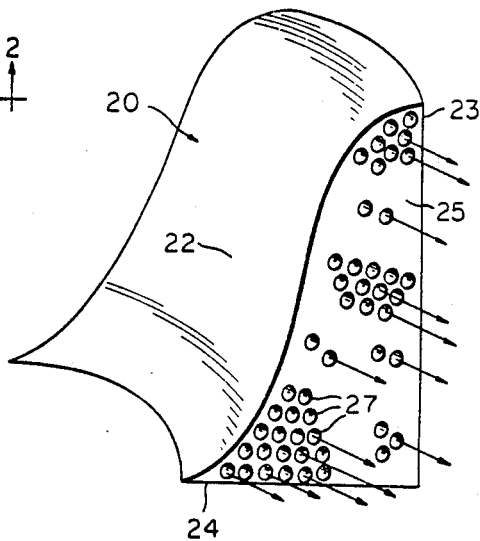
FIG. 4 is an enlarged perspective view of one of the removable air inlets which are positioned in the chamber of the dryer/granulator.

Referring more particularly to the drawings, the fluidized bed dryer/granulator according to the invention is indicated generally at 10 in the drawings and comprises a housing having a cylindrical chamber 11 with a top wall 12 having a plurality of filtered outlets 13 distributed thereover. The filtered outlets may comprise, for example, suitable frames (not shown) with cloth filter bags 14 secured thereover. A number of inlet nozzles 15 are also uniformly distributed over the top wall 12 for spraying a desired coating material into the chamber. For example, the material might be any water-soluble polymer, sustained release coating for pellets used in the manufacture of pharmaceutical capsules.

A frustoconically shaped bowl 16 at the bottom of the chamber has an inwardly tapered wall 17 terminating at its lower end in a perforated bottom wall 18. An axial air inlet 19 is connected to the bottom of the chamber for effecting an axially upward flow of air through the perforated bottom wall 18 and thence upwardly through the bowl and chamber and outwardly through the filtered outlets 13.

A pair of diametrically opposed, perforated, removable, lateral or circumferential air inlet housings 20 and 21 are supported in the bottom of the bowl 16 on perforated bottom wall 18 and side wall 17. Each air inlet housing 20 and 21 has a curved front wall 22, a back wall 23, bottom wall 24, and opposite side walls 25 and 26. One of the side walls 25 in each removable air inlet housing is perforated as at 27. An air inlet 28 is connected with the interior of the housing 20 through nonperforate wall 26, and an air inlet 29 is connected with the interior of the housing 21 through nonperforate wall 26. It should be noted that the perforated side walls 25 in the air inlet housings face in the same circumferential direction, i.e., either clockwise or counterclockwise (clockwise as shown in FIG. 3). Consequently, the streams of air flowing from the axial air inlet 19 and the circumferential air inlets 20 and 21 interact to cause an orbital or swirling motion to the air flowing through the bowl and chamber, as shown by the arrows "A" in FIG. 2.

Figure 2:
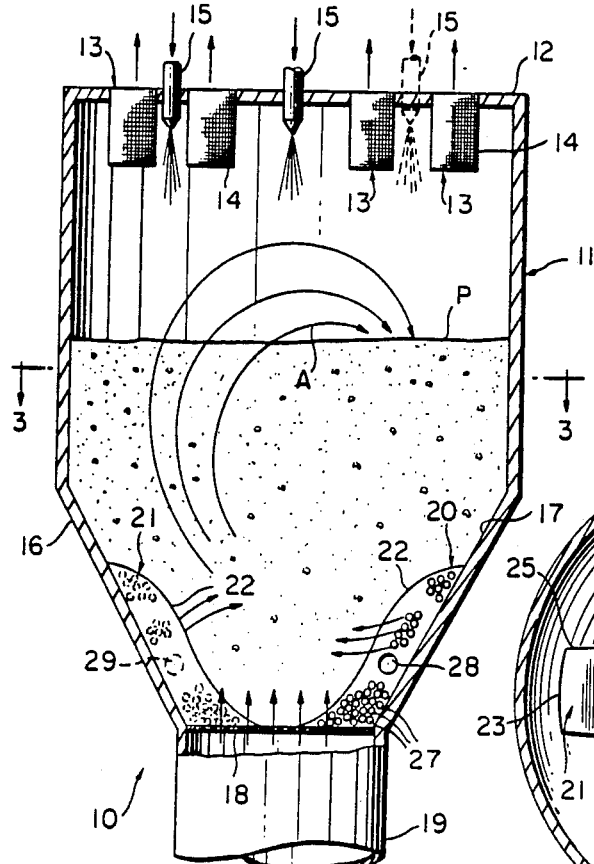
FIG. 2 is a vertical sectional view taken along line 2—2 in FIG. 1.
Figure 3:
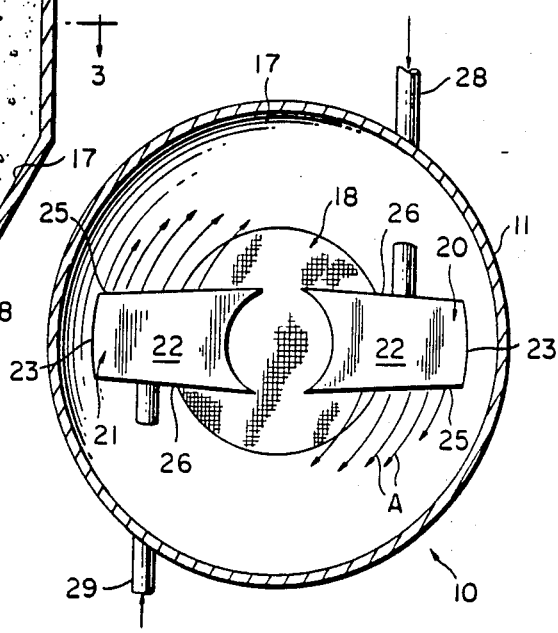
FIG. 3 is a transverse sectional view taken along line 3—3 in FIG. 2.

In use, a quantity of granular material, such as pellets "P" for use in making filled medicinal capsules, is placed in the chamber as shown in FIG. 2 and air is caused to flow through the axial inlet 19 and circumferential inlets 20 and 21, thereby producing an orbital motion in the pellets. A suitable coating material may then be introduced into the chamber via nozzles 15 for coating the pellets. The motion of the pellets in the chamber insures maximum coverage of the pellets in a minimum amount of time. In fact, an increase in the rate of coating of fifteen to twenty times the normal rate has been observed.

The air inlet housings 20 and 21 simple rest in the bowl and can be lifted out, if desired, to return the apparatus to normal configuration so that it can be used for other purposes.

The size of the perforations in the side walls 25 of air inlet housings 20 and 21 may be varied by simply replacing that wall, as desired, to obtain an opening size compatible with the size of the pellets being treated.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A fluidized bed apparatus for drying particles, comprising:

a chamber having a top wall, a side wall and a bottom wall;

an axial air inlet in the bottom wall communicating with the interior of the chamber for directing an axial flow of air upwardly through the chamber; and at least one stationary removable lateral air inlet housing resting in said chamber on at least one of said side wall and bottom wall of the chamber and having a perforated side wall facing tangentially to the side wall of the chamber for discharging a flow of air into the chamber in a direction tangential to the chamber side wall, the axial and lateral air flows interacting to produce a swirling or orbital motion for suspending and circulating said particles in a three-dimensional rotational path in the interior of the chamber for thorough admixing and drying of the particles, said removable lateral air inlet housing being capable of being simply lifted out of said chamber to quickly and easily adapt the apparatus to use in other processes.

2. A fluidized bed apparatus as claimed in claim 1, wherein:

the perforated side wall of the lateral air inlet housing is replaceable for substituting different size perforations for use with different size pellets.

3. A fluidized bed apparatus as claimed in claim 1, wherein:

the chamber side wall is generally cylindrical in configuration; and there are two diametrically opposed lateral air inlet housings arranged to direct air in the same circumferential direction in the chamber.

4. A fluidized bed apparatus as claimed in claim 3, wherein:

the side wall includes an inwardly tapering portion, and said lateral air inlets rest on the bottom wall and the inwardly tapering portion.

5. A fluidized bed apparatus as claimed in claim 4, wherein:

a plurality of filtered air outlets are in the top wall of the chamber.

6. A fluidized bed apparatus as claimed in claim 5, wherein:

at least one spray nozzle extends through the top wall of the chamber for directing a spray of material into the housing to coat the particles circulating in the chamber.

7. A fluidized bed dryer/granulator apparatus for coating pellets used in pharmaceutical preparations, comprising:

a chamber for containing a supply of pellets to be coated, said chamber having a top wall and a cylindrical side wall;

spray nozzle means in the top wall for directing a spray of coating material into the chamber for coating pellets contained therein;

an inwardly tapered bowl at the bottom of the chamber side wall, said bowl having a perforated bottom wall;

an axial air inlet connected with the perforated bottom wall to direct an axial flow of air upwardly through the bowl and chamber;

a plurality of lateral air inlet housings supported in the bowl, said lateral air inlet housings having means for directing flows of air in a common circumferential direction in the bowl and chamber, whereby said axial and lateral air flows interact to form an orbital or swirling motion in the bowl and chamber to promote circulation of air and pellets and thus increase the rate of coating and drying of pellets contained in the chamber, said air inlet housings resting on said inwardly tapered bowl and perforated bottom wall of the chamber and being capable of being removed by simply lifting them out of the chamber for quick and easy conversion of the apparatus to use for other processes; and filtered air outlet means in the top wall for flow of air outwardly from the chamber.

8. A fluidized bed dryer/granulator as claimed in claim 7, wherein:

the means in said air inlet housings for effecting circumferential flows of air comprise replaceable perforated side walls for substituting different size perforations for use with different size pellets.

* * * * *